No. 12,570. REISSUED NOV. 27, 1906.
T. RALL.
MOVABLE BRIDGE.
APPLICATION FILED MAY 11, 1906.
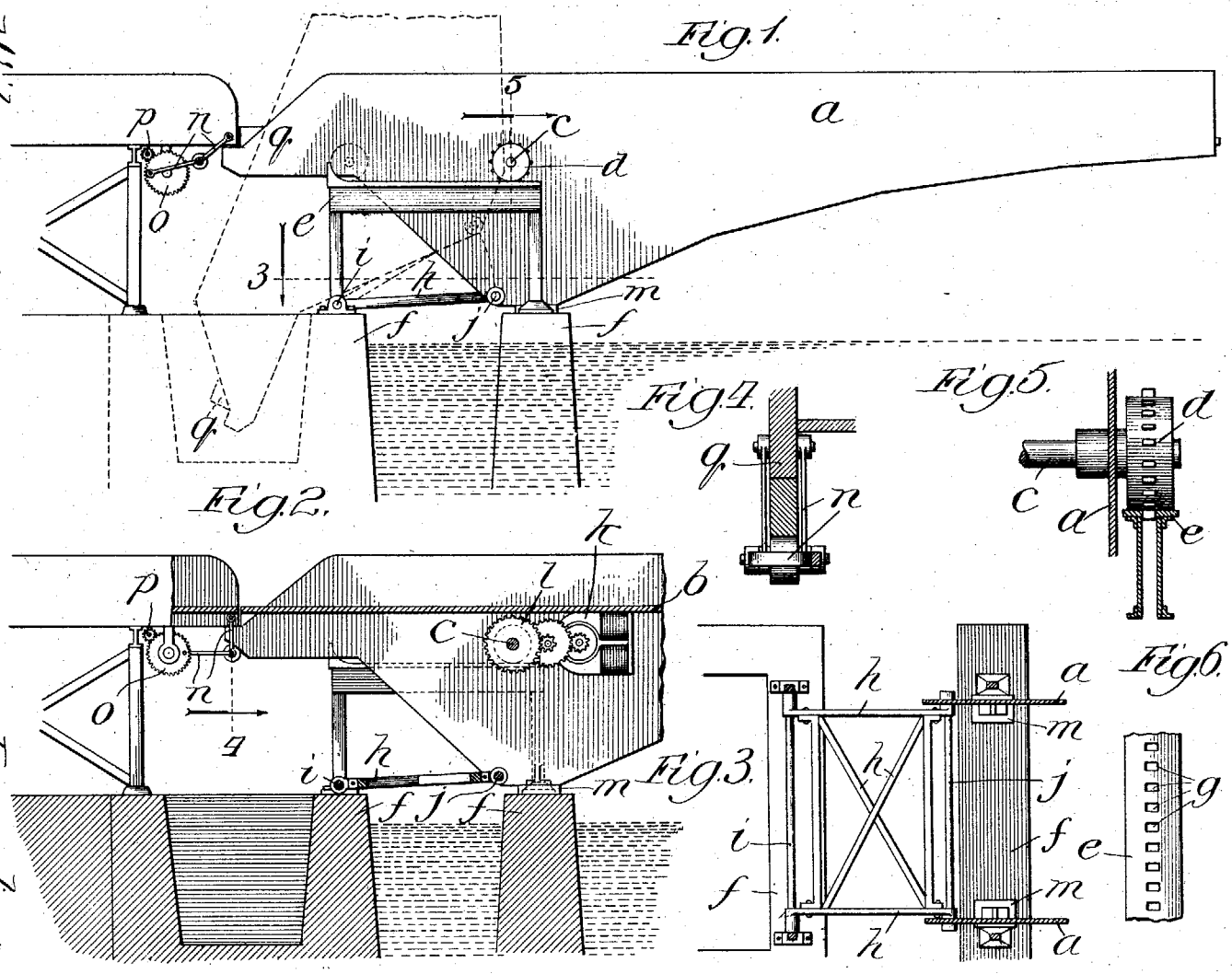
Witnesses:
Chas. E. Taylord,
Chas. H. Bull.
Inventor:
Theodor Rall,
By Thomas F. Sheridan
Atty.

UNITED STATES PATENT OFFICE.

THEODOR RALL, OF CHICAGO, ILLINOIS.

MOVABLE BRIDGE.

No. 12,570. Specification of Reissued Letters Patent. Reissued Nov. 27, 1906.

Original No. 669,348, dated March 5, 1901. Application for reissue filed May 11, 1906. Serial No. 316,391.

*To all whom it may concern:*

Be it known that I, THEODOR RALL, a citizen of the United States, residing at Chicago, in the county of Cook and State of Illinois, have invented certain new and useful Improvements in Movable Bridges, of which the following is a specification.

This invention relates to that class of movable bridges known as "bascule" bridges, in which there is a platform swinging in a vertical plane, so as to open or close passage over a canal, river, or other waterway, all of which will be more fully hereinafter described.

The principal object of the invention is to provide a simple, economical, and efficient movable bridge of the bascule type.

A further object is to provide a bridge of the bascule type with simple and efficient means by which it may be economically operated—that is, opened and closed.

Further objects of the invention will appear from an examination of the drawings and the following description and claims.

The invention consists principally in the combination of a track portion, a vertically-swinging-platform portion provided with a drive-roller or drive-wheels at its pivotal point where it rests upon the track, and means for turning the same, and thereby opening and closing the bridge.

The invention consists, further, in the combination of a track portion, a vertically-swinging-platform portion provided with drive-wheels or a roller at its pivotal point where it rests upon the track, link or strut mechanism pivotally connected to a fixed portion and to the swinging platform at a point or points off center to the fulcrum-points, and means for rotating the wheels or roller so as to move the same backward or forward on the track, and thereby open or close the bridge.

The invention consists, further and finally, in the features, combinations, and details of construction hereinafter described and claimed.

In the accompanying drawings, Figure 1 is a side elevation of a bridge constructed in accordance with these improvements; Fig. 2, a longitudinal central vertical sectional view of a portion of the mechanism shown in Fig. 1; Fig. 3, a plan sectional detail taken on line 3 of Fig. 1 looking at the mechanism from above; Fig. 4, a sectional detail taken on line 4 of Fig. 2 looking in the direction of the arrow; Fig. 5, a similar view taken on line 5 of Fig. 1, and Fig. 6 a plan view of a portion of the supporting-track.

In illustrating and describing my improvements I have only illustrated and described that which I consider to be new, taken in connection with so much as is old as will properly disclose the invention and enable those skilled in the art to practice the same, leaving out of consideration other and well-known elements which if illustrated and described herein would only tend to confusion, prolixity, and ambiguity.

In constructing a bridge in accordance with my improvements a swinging portion or platform *a* is provided, which is formed of two side trusses or girders carrying the platform or roadway *b* between them. These trusses or girders, which carry the platform or roadway of the bridge, are arranged to swing in a vertical plane, as is usual in all types of bascule bridges.

In order to operate the bridge in the above-described manner, the swinging portion is provided with a shaft *c*, which is loosely or rotatably mounted therein and is practically the fulcrum-point thereof. Mounted rigidly upon this axle or shaft, at either end thereof, are wheels *d*, resting upon a track or tracks *e*, formed by metallic girders, which in turn are supported upon the base or foundation *f*. An examination of the drawings will show that these wheels are nothing more nor less than spur gears or pinions, the spurs of which are passed through perforations *g* in the track *e*, which in technical terms may be considered as a "rack." The providing of this rack and pinion has for one purpose the preventing of the bridge from being opened or closed by wind-pressure—that is, slid along by the wind acting against the surface of the bridge—which would thereby open or close the bridge, together with other purposes, as hereinafter more fully described.

Struts or links *h* are provided and pivotally connected at *i* to a fixed portion of the frame or foundation and to the swinging portion of the bridge at *j* at points off center to the fulcrum of the bridge, so that as the wheels, gears, or antifriction-rollers, which practically form the fulcrum-point of the bridge, are rotated backward and forward on the track the pivotal connection of the strut and the swinging platform is compelled to travel in the arc of a circle, as shown in dotted outline in Fig. 1, and thus force or compel the swinging portion to swing in a vertical plane to open or close the bridge.

It becomes necessary in view of the foregoing to provide means by which the antifriction rollers, gears, or wheels may be rotated, so as to carry the bridge backward and forward on the track and open and close the bridge. To accomplish this result, I have shown one means for doing the same composed of an electric motor *k*, connected with the shaft on which are the antifriction-rollers, wheels, or gears by means of a train of compound gearing *l*, (see Fig. 2,) so that when electric current is supplied to the motor its armature-shaft is rotated, which thereby rotates the roller-shaft, which acts to rotate the rollers or wheels backward and forward on the track and compels the platform to swing in a vertical plane to open or close the bridge.

It is desirable that some means should be provided so that when the bridge is in the position for traffic or supporting a live load the load should be taken off at the fulcrum-point to minimize the wear of the same. To accomplish this, the side girders of the bridge are provided with downwardly-projecting portions so arranged that they contact the foundation at *m* (see Fig. 1) before the tail of the bridge touches the bumper. The further movement of the bridge causes the tail portion thereof to bear against the bumper, as shown in Fig. 2, and at the same time raise the wheels or rollers slightly from the track, so that the live load is supported directly on the foundation without the intermediary of such wheels or rolls. This tilting around the point *m* does not require much force, as the center of gravity, which is the center of the shaft, is nearly vertical above such point.

For the purpose of locking the swinging span in position compound link mechanism *n* is provided, one end of which is pivotally connected to the approach of the bridge and the other to a spur-gear *o*, which is operated by a pinion *p*. In Fig. 1 the parts are shown leaving the bridge free to be operated. In Fig. 2 they are shown so that the common fulcrum-point of the links is passed underneath an incline in the tail of the bridge to force it up against its bumper, and hold the bridge in closed position. The tail portion of the bridge is provided with counterweights *q*, so that the center of gravity of the total dead load falls in or near the center of the supporting-shaft *c*. It will thus be seen that during the operation of opening or closing the bridge when the same rests entirely upon the shaft *c* with its antifriction wheels or rollers the minimum amount of power only will be necessary to open and close the bridge.

From the foregoing description of construction and operation and an examination of the drawings it will be seen that a bridge constructed in accordance with these improvements is very economical to construct and simple and efficient in operation and that all curved members and complicated operating-struts are avoided and, further, that the bridge is very easy of access and economical to repair.

I claim—

1. In a bridge of the class described, the combination of a vertically-swinging-platform portion provided with movable fulcrum mechanism, means for moving said swinging-platform portion backward and forward on its movable fulcrum mechanism, and means for taking the load off the movable fulcrum mechanism when the swinging platform is in its lowered closed position, substantially as described.

2. In a bridge of the class described, the combination of a track portion, a vertically-swinging-platform portion provided with supporting drive-wheels or drive-rollers where the weight of the swinging-platform portion is transmitted to the track, and means for moving the rollers backward and forward upon the track to open and close the bridge, substantially as described.

3. In a bridge of the class described, the combination of a supporting-track portion, a vertically-swinging-platform portion provided with wheels or rollers where the weight of the swinging-platform portion is transmitted to the track, link mechanism pivotally connected to the supporting portion and to the swinging-platform portion at a point or points off center to the fulcrum-point, and means for rotating the wheels or rollers so as to operate the same backward and forward upon the track and thereby open and close the bridge, substantially as described.

4. In a bridge of the class described, the combination of a supporting-track, a vertically-swinging-platform portion, a shaft rotatably extending through the same practically forming the fulcrum of the swinging platform and provided with wheels or rollers at or near its outer ends where it rests upon the supporting-track, link mechanism pivotally connected to the supporting portion and to the swinging-platform portion at a point or points off center to the fulcrum-point, and mechanism for rotating the wheels or rollers so as to rotate the same backward and forward on the track and thereby open and close the bridge, substantially as described.

5. In a bridge of the class described, the combination of a supporting-track portion, a vertically-swinging-platform portion provided with wheels or similar elements where the weight of the swinging-platform portion is transmitted to the track, stop mechanism arranged to be contacted by the swinging platform so that when the same is in its completely-closed position the fulcrum-wheels are raised from the track, link mechanism pivotally connected to the supporting portion and to the swinging platform at a point or points off center to the fulcrum, and means for moving the rolls backward and forward upon the track so as to open and close the bridge, substantially as described.

6. In a bridge of the class described, the combination of a supporting-track portion forming a substantial rack, a vertically-swinging-platform portion, a shaft rotatably extending through the same practically at its fulcrum-point and provided with spur-wheels at each end thereof where it rests upon the track, link mechanism pivotally connected to the supporting portion and to the swinging platform at points off center to the fulcrum-points, and means for rotating the spur-wheels so as to move the same backward and forward on the supporting-track and thereby open and close the bridge, substantially as described.

THEODOR RALL.

Witnesses:
W. T. JONES,
A. P. COURTENAY.